United States Patent [19]

Weppler

[11] Patent Number: 5,661,700

[45] Date of Patent: Aug. 26, 1997

[54] SYNCHRONIZABLE LOCAL CLOCK FOR INDUSTRIAL CONTROLLER SYSTEM

[75] Inventor: Robert C. Weppler, Mayfield Heights, Ohio

[73] Assignee: Allen-Bradley Company, Inc., Milwaukee, Wis.

[21] Appl. No.: 276,298

[22] Filed: Jul. 18, 1994

[51] Int. Cl.[6] .................... G04B 47/00; G04C 11/00
[52] U.S. Cl. .................................. 368/46; 368/10
[58] Field of Search ................. 368/46–55, 155, 368/156, 10

[56] References Cited

U.S. PATENT DOCUMENTS

| | | | |
|---|---|---|---|
| 4,746,920 | 5/1988 | Nellen et al. | 368/47 |
| 4,952,367 | 8/1990 | Porter et al. | 364/200 |
| 5,040,158 | 8/1991 | Lee et al. | 368/10 |
| 5,087,829 | 2/1992 | Ishibashi et al. | 368/46 |
| 5,402,394 | 3/1995 | Tursky | 368/10 |

*Primary Examiner*—Bernard Roskoski
*Attorney, Agent, or Firm*—Keith M. Baxter; John M. Miller; John J. Horn

[57] ABSTRACT

A method of providing a standard coordinated time throughout spatially separated functional modules of an industrial controller employs a module operating as a time master which transmits a coordinated time to various dependent modules through communication modules. The dependent modules have local clocks which are synchronized to the coordinated time value by adjusting their clock frequency according to the difference between local time provided by that clock and the coordinated time value. This gradual correction prevents lost count values and disruption to the control process. The most and least significant bits of the time value may be transmitted at separate rates to reduce link traffic.

6 Claims, 2 Drawing Sheets

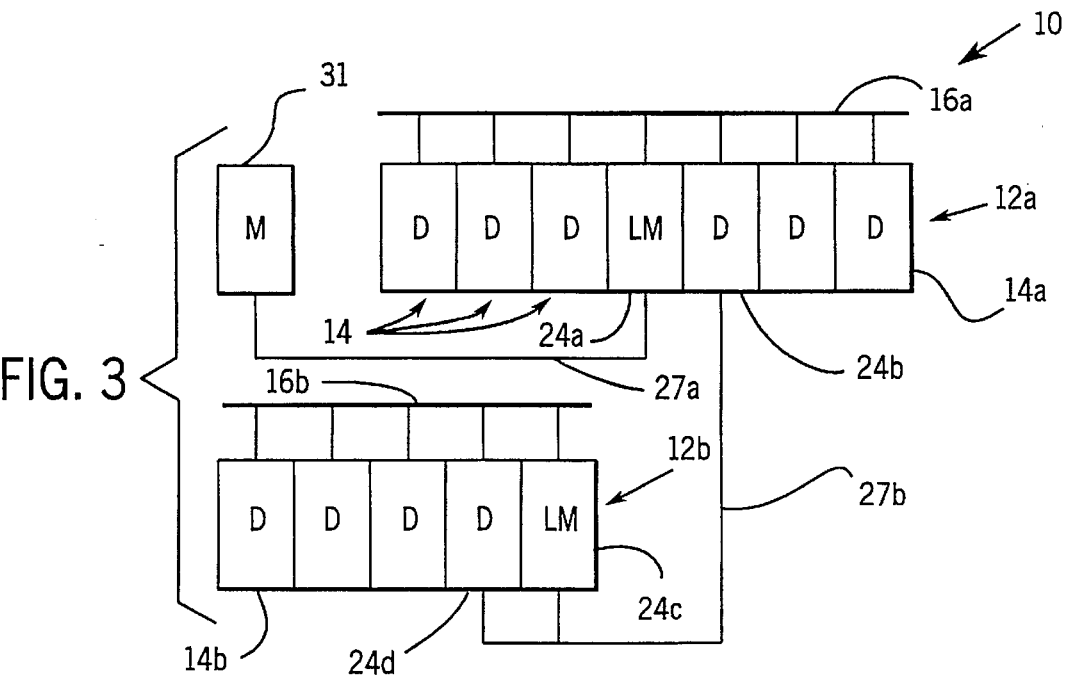
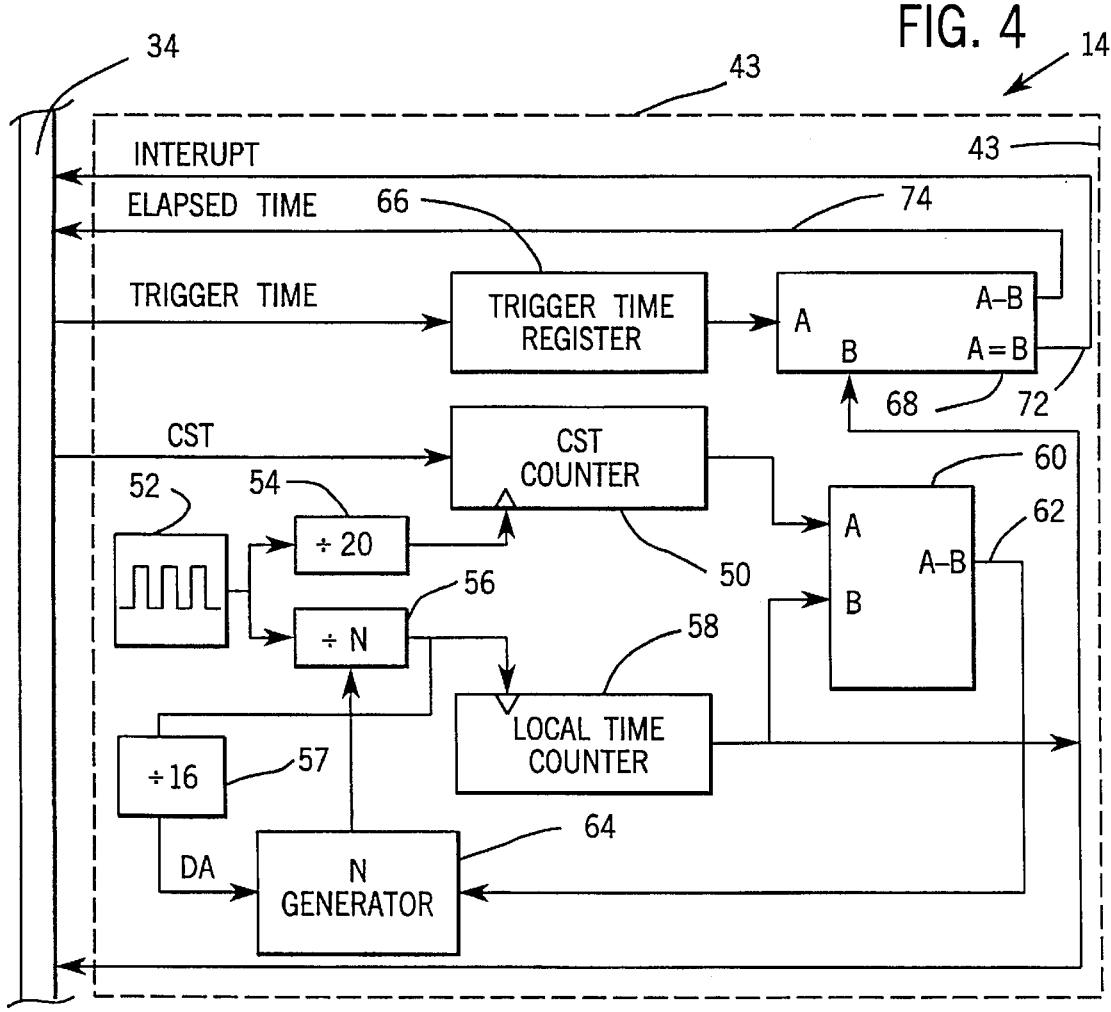

SYNCHRONIZABLE LOCAL CLOCK FOR INDUSTRIAL CONTROLLER SYSTEM

FIELD OF THE INVENTION

The present invention relates to industrial controllers for the real-time control of industrial processes, and in particular, to a clock circuit in functional modules of an industrial controller that permits the precise coordination of actions among different functional modules.

BACKGROUND OF THE INVENTION

Industrial controllers are special purpose computers used for controlling industrial processes and manufacturing equipment. Under the direction of a stored program, the industrial controller examines a series of inputs, reflecting the status of the controlled process, and changes a series of outputs controlling the industrial process. The inputs and outputs may be binary, that is on or off, or analog reading or providing a value within a continuous range.

An industrial controller differs from a conventional computer in two respects. First, unlike a computer, an industrial controller is normally customized to the particular process it is controlling both by writing new control software stored in the controller's memory, and by changing the hardware configuration of the controller itself. The ability to re-configure the hardware economically is provided by dividing the industrial controller into a number of functional modules each performing a different function.

Different combinations of modules may be selectively linked together on a backplane or connected together via one or more communication links. The modules may include, for example, processors, power supplies, communication interfaces and input and output interfaces. Each module generally incorporates a microprocessor and related circuitry and operates according to a local stored program.

An industrial controller also differs from a computer in that the various components of an industrial controller may be separated by a considerable distance commensurate with the expanse of a large factory or manufacturing operation. The separated functional modules communicate via digital messages transmitted over the communication links which provide input and output information. Digital messages may be assigned one of several levels of priority, with high priority messages obtaining use of the shared communications media in preference to low priority messages. Normally only a certain percent of the bandwidth, or message carrying capacity of the communication link, is allocated to high priority messages so that a certain rate of transmission of low priority messages will always be ensured even with heavy traffic in high priority messages.

Multiple communication links may be joined by "bridges" or "relays" which serve to translate messages from a first link to the format and according to the protocol of the second link.

Precise coordination of actions between separated functional modules of a large industrial controller may be difficult. One particularly demanding application is the measurement and control of electrical waveforms at spatially separate points, either for motor control or for the characterization of electrical power. Here, control resolution on the order of a few microseconds is necessary. Yet even with high speed communication links, the time required to arbitrate for control of the communication link for transmission of a coordinating message, and the time required to translate a message between the different communication links that may separate the modules, via one or more bridges, may far exceed this desired precision. Further, when it is necessary, at one time to transmit on a communication link multiple commands requiring precise execution, insufficient high priority channel capacity may be available and one message may have to be delayed.

SUMMARY OF THE INVENTION

The present invention synchronizes local clocks in each functional module of an industrial control system and uses those local clocks to trigger the execution of instructions previously transmitted on the communications links to the modules. A trigger time associated with each instruction indicates when the instruction is to be executed. Thus, it is important only that an instruction arrive at the functional module some time before its trigger time. Precise transmission times for the instruction are unnecessary.

It is a general object of the invention, therefore, to permit functional modules separated by communication links to execute instructions simultaneously when the arrival time of the instructions at the modules cannot be guaranteed.

The local clocks are synchronized by the transmission of a system time signal from a master functional module. The regularity of the system time signal messages eliminates the possibility of "bunching" that would overtax the link's capacity. In contrast, the instructions themselves, even if there are many with the same trigger time, may be sent much before their execution, eliminating bunching.

The system time signal is transmitted in two parts and at two rates. Specifically, the master module periodically transmits the least significant bits of the system time signal at a first rate and the most significant bits of the system time signal at a second rate slower than the first rate. The local clocks are updated separately by the received most significant bits and the least significant bits of the time value.

Thus, it is one object of the invention to provide a coordinating signal for the local clocks in the modules of an industrial control system that makes efficient use of the bandwidth of connecting communications links. Sending the most significant bits at a slower rate preserves link bandwidth without sacrificing information, provided only that the second rate is just fast enough to accurately reflect changes in the most significant bits.

The updating of the clocks of the local masters and those modules dependent on the local masters for time values is performed gradually by adjusting the clock rate of the clocks rather than by adjusting their time value directly. This eliminates the possibility of sharp discontinuities in the time indicated, missed time values or repeating a time value.

Specifically, the internal clocks of the functional modules, that must have their time corrected, each include a synchronization counter receiving and holding a periodic synchronizing value. A local time counter, driven by a time base producing a first clock signal having a frequency, provides a local time value.

A comparator compares the synchronization value to the local time value to produce an error signal and the error signal is used to adjust the frequency of the first clock signal to reduce the magnitude of the error signal.

Thus it is another object of the invention to provide a method of adjusting local clocks to an external synchronization signal that ensures that no time values are dropped or repeated as a result of the adjustment process. Such repetition or loss of time values might occur if the synchronizing value were directly loaded into the local time counter. Because the local clock is used to trigger execution of the instructions that have previously arrived at the module, duplicate or missing time values could otherwise cause the instruction to be executed twice or not at all.

The synchronizing counter receiving the periodic synchronization value must be advanced by a second clock signal so as to remain substantially current in between times that the periodic synchronization value is received.

Thus, it is another object of the invention to provide the ability to continuously correct the local clocks of the modules as is necessary to avoid sharp discontinuities in the counting rate of local time.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

BRIEF DESCRIPTION OF THE DRAWINGS

FIG. 3 is a schematic representation of the interlinking of the various functional modules of the industrial controller of FIG. 1 showing their division in operation among master, local master and dependent modules; and FIG. 4 a block diagram of the clock circuit of FIG. 2 producing a local time value used to coordinate the activities of the module.

DETAILED DESCRIPTION OF THE PREFERRED EMBODIMENT

Figure 1:
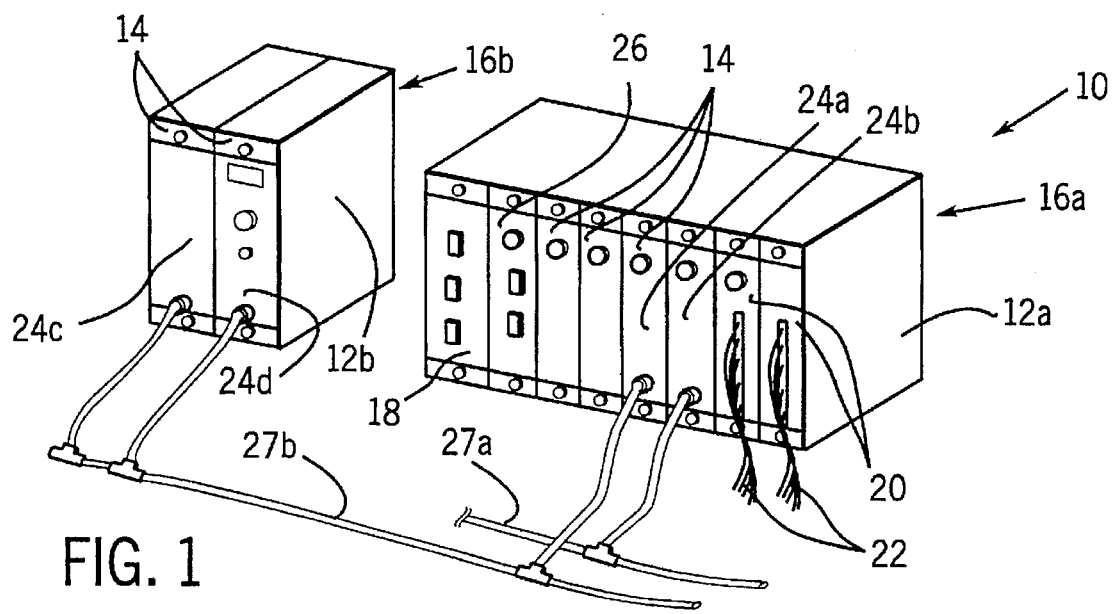
FIG. 1 is a perspective view of an industrial controller having multiple functional modules contained in several racks joined by communication links.

Referring to FIG. 1, an industrial controller 10 suitable for use with the present invention provides a first and second rack 12a and 12b for holding a number of functional modules 14. The modules 14 within rack 12a are electrically interconnected by backplane 16a and the modules 14 within rack 12b are electrically interconnected by backplane 16b. Each backplane 16a and 16b runs along the rear of its respective racks 12a or 12b.

The modules 14 may be individually removed from racks 12a and 12b thereby disconnecting the module 14 from its respective backplane 16 for repair or replacement or to allow custom configuration of the industrial controller 10.

The modules 14 within the rack 12a may include, for example, a power supply module 18, a processor module 26, two communication modules 24a and 24b and two I/O modules 20. Power supply module 18 receives an external source of power (not shown) and provides regulated voltages to the other modules 14 by means of conductors on the backplane 16a.

I/O modules 20 provide an interface between inputs from, and outputs to external equipment (not shown) via cabling 22 attached to the I/O modules 20 at terminals on their front panels. As is understood in the art, the I/O modules 20 convert input signals on the cables 22 to digital words for transmission on the backplane 16a. The I/O modules 20 also convert other digital words from the backplane 16a to the necessary signal levels for control of equipment.

The processor module 26 processes information provided by the communication modules 24, to be described, and the I/O modules 20 according to a stored program and provides output information to the communication modules 24 and the I/O modules 20 in response to that stored program and received input messages.

The communication modules 24a and 24b provide an interface between the backplane 16a and one of two external high speed communication links 27a and 27b. The high speed communication links 27a and 27b may connect with other modules 14.

Referring also to FIG. 3 in the present example, high speed communication link 27a connects communication module 24a with a remote time-master module 31 whose function will be described, whereas high speed communication link 27b connects communication module 24b with communication modules 24c and 24d in rack 12b.

Figure 2:
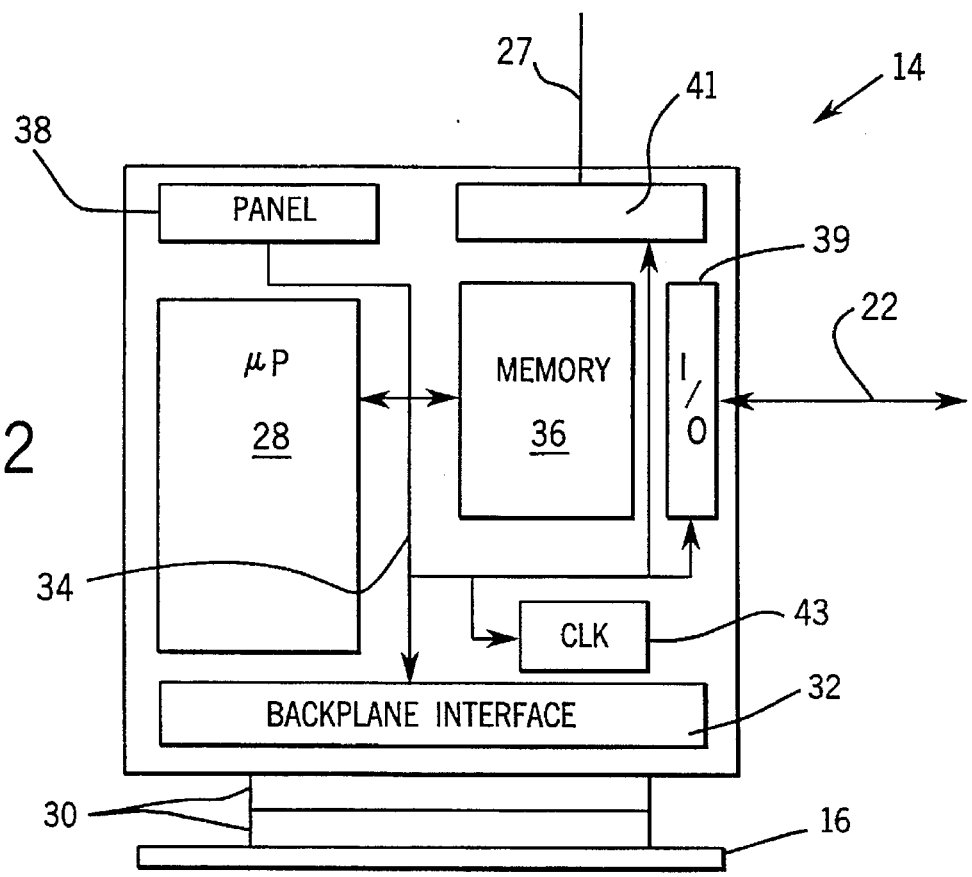
FIG. 2 is a block diagram of a single typical functional module of FIG. 1 showing its connection to a common backplane and communication links to communicate with other modules and showing an internal clock circuit used to synchronize its operation with other modules.

Referring now to FIGS. 1 and 2, each functional module 14, is attached to the backplane 16 by means of a separable electrical connector 30 that permits the removal of the module 14 from the backplane 16 so that it may be replaced or repaired without disturbing the other modules 14. The backplane 16 provides the module 14 with both power and a communication channel to the other modules 14. Local communication with the other modules 14 through the backplane 16 is accomplished by means of a backplane interface 32 which electrically connects the backplane 16 through connector 30. Backplane interface 32 monitors messages on the backplane 16 to identify those messages intended for the particular module 14, based on a message address being part of the message and indicating the message's destination. Messages received by the backplane interface 32 are conveyed to an internal bus 34 in the module 14.

The internal bus 34 joins the backplane interface 32 with a memory 36, a microprocessor 28, front panel circuitry 38, I/O interface circuitry 39 (if the module is an I/O module 20) and communication link interface circuitry 41 (if the module is a communication module 24). The microprocessor 28 may be a general purpose microprocessor providing for the sequential execution of instructions contained in memory 36 and the reading and writing of data to and from the memory 36 and the other devices associated with the internal bus 34.

The microprocessor 28 includes an internal clock circuit (not shown) providing the timing of the microprocessor 28 but may also communicate with an external clock circuit 43 of improved precision. This clock circuit 43 may include a crystal controlled oscillator or other time source such as a radio link to an NBS time standard. The precision of the clock circuit 43 is recorded in the memory 36 as a quality factor that allows the module 14 to compare the quality of its clock circuit 43 to those of other modules so that the best module 14 may become a master time source.

The panel circuitry 38 may include status indication lights such as are well known in the art and manually operable switches such as for locking the module 14 in the off state.

The memory 36 holds programs executed by the microprocessor 28 to provide the function provided by the module 14. The memory 36 also stores variables and data necessary for the execution of those programs. For I/O modules 20, the memory 36 also includes an I/O table holding the current state of inputs and outputs transmitted to and received from the industrial controller 10 via the I/O modules 20.

Generation of a Coordinated System Time Signal

Referring now to FIG. 3, each functional module 14 for the purposes of establishing a system time common to all functional modules 14 may operate in one of up to three modes: global master, local master or dependent. The global master module 31, in the example of FIG. 3 designated by the letter "M", provides a coordinated system time signal ("CST") to all other functional modules 14 either directly through a high speed communication link 27a or indirectly through the agency of one or more relays as will be described. There can be only one module 14 actively sourcing the CST value at any given time.

In the preferred embodiment, the CST signal is a 64 bit value representing a counted number of microseconds from an arbitrary origin in time. The CST signal indicates the time value of the next microsecond tick of the microsecond clocks of each of receiving functional modules 14 and thus ensures that each of the receiving modules 14 has the same count value upon receipt of the CST message. In between CST signals, the modules 14 track the entire 64 bit count value internally relying on the CST messages only to correct any drift in this count value on a periodic basis.

Communication module 24a designated by the letters "LM" in FIG. 3 receives the CST signal from communication link 27a and uses it to correct the time value in its local clock. The communications module 24a then acts as a local master, using the local time value to generate a second time value signal forwarded on a second communication channel of the backplane 16a for use by all the modules in rack 12a. Communication module 24b, in turn, receiving the CST signal from the backplane 16a, retransmits it to the high speed communication link 27b to be received by the communication modules 24c also acting in a local master capacity to forward the CST message to backplane 16b.

Generally any communication module 24 may act as a bridge between different communication links, either the high speed links 27 or the backplanes 16. A communication module 24 may be a local master of one or more links, for example, of both a backplane 16 and a high speed link 27.

In the preferred embodiment, the transmission of the most significant bits (MSB) of the CST signal is relatively infrequent to conserve the bandwidth of the communication links 27a and 27b. Therefore the communication modules 24 in acting as local masters must use their internal clock circuits 43 to generate a more frequent resynchronizing signal (the least significant bits (LSB) of the CST) for other modules 14 on the backplane 16. For example, the CST MSB signal may be a message transmitted as infrequently as several times per second whereas the communication modules 24 acting as a local master may transmit on the backplane 16 the CST LSB once every few milliseconds based on their internal clocks updated from the CST MSB signal. Thus modules 14 which may not have clocks sufficiently accurate to preserve the correct time value in between updates from the CST MSB value are provided with more frequent updates derived from the synchronized clock of the local master communication module 24.

The modules operating in a dependent mode, designated by the letter "D", receive both the CST MSB signal and the more frequent CST LSB resynchronizing signal from a local master, keyed to the CST signal, for use in carrying out instructions. These modules 14 do not themselves transmit a synchronizing signal.

Use of the Coordinated System Time

A principal use of the coordinated system time is to ensure simultaneous actions among modules 14 separated across communication links 27a or 27b or backplane 16a or 16b. In one use of the coordinated system time value, different modules 14a and 14b separated from each other spatially and through links of backplane 16a and high speed communication link 27b may be instructed to trigger a certain action, for example, the starting of a motor or the sampling of a signal, at a common CST value sometime in the future.

The times of arrival of these "starting" or "sampling" instructions at the given modules 14a and 14b need not be specified provided they are prior to the time of the required action. Each instruction carries with it a trigger time that instructs the module as to when the instruction is to be triggered, and the instruction is held unexecuted until then. The module, tracking the CST LSB value by means of its internal clock updated through the CST LSB message or a message derived from the CST LSB message, triggers the desired action when the local time indicated on its internal clock equals the trigger time. This system ensures that the actions of the modules 14a and 14b are closely coordinated in time regardless of a much larger uncertainty in the arrival of the instructions associated with that action.

If the action required by the instruction is to sample a particular value, that value may be returned via the communication links 27b and 16a to a processor module without the need for precise determination of when that return message will arrive because the data is essentially "time stamped" by knowledge of the trigger time of the instruction that caused the acquisition.

Referring now to FIGS. 2 and 4, the clock circuit 43 is connected to the internal bus 34 so as to receive the CST LSB message obtained by the module 14 over a communication link 27(a) or 27(b). The CST LSB value is stored in a 16 bit CST counter 50 as soon as it is received by the parallel loading of the CST LSB value into the counter as is well known in the art.

A time base oscillator 52 running at 20 MHz passes through a divide by twenty counter 54 and is received by a clock input of the CST counter 50 so as to continually update the CST LSB value last received according to a local time source. Generally, the time base oscillator 52 may not be as accurate as the time base producing the CST LSB value, however, over the short run (between CST LSB messages), it will drift only a small amount with respect to the CST LSB value.

Nevertheless, for many purposes, even this small amount of drift may be unacceptable. For this reason, the time base oscillator 52 also provides its square wave signal as an input of a divide by N counter 56 such as is well known in the art. A divide by N counter receives an integer value N and divides the rate at its input by that integer N to produce an output having that divided rate.

The output of the divide by N counter 56 goes to a local time counter 58 so that the 20 MHz square wave from time base oscillator 52 is divided by a value N and then provided to the clock input of the local time counter.

The local time counter 58 will generally not have the same value as that held in the CST counter 50. At initialization of the industrial controller 10, the local time counter may be loaded with the CST LSB value but otherwise such direct loading of the local time counter is not done. The reason for this is that loading the local time counter 58 with a CST LSB value would typically cause an abrupt change in the value of the local time such as may cause erroneous control actions as will be described further below.

Preferably, therefore, the local time counter 58 is brought into agreement with the CST counter 50 gradually so as to prevent disruptive rapid change in local time. In particular, the output of the CST counter 50 showing the current CST LSB time as updated by the time base oscillator 52 is compared to the output of the local time counter in a subtracter circuit 60 which provides an error signal 62 having a sign and magnitude dependent on the arithmetic difference between the CST counter value and that of the local time counter 58.

This error signal 62 is provided to an N generator 64 which provides a value of N as a function of this error signal 62. Generally, if the error signal 62 is of low magnitude, meaning that the value of the local time is very close to that of the CST LSB update, the value of N will be 20 providing that the local time advance one count every microsecond. If the error signal 62 indicates that the CST counter is greater than the local time counter, the local time counter is advanced more quickly by using a smaller value of N. Conversely, if local time is ahead of the CST time, a larger value of N is selected. The particular values of N are shown in following Table I.

TABLE I

| Error (μs) | DA | N | Description of adjustment |
|---|---|---|---|
| 16385–32768 | X | 22 | 9% slow |
| 8193–16384 | X | 22 | 9% slow |
| 4097–8192 | X | 22 | 9% slow |
| 2049–4096 | X | 22 | 9% slow |
| 1025–2048 | X | 21 | 5% slow |
| 513–1024 | X | 21 | 5% slow |
| 257–512 | X | 21 | 5% slow |
| 1–256 | 0 | 21 | 5% slow part of .25% slow |
| 1–256 | 1 | 20 | Normal part of .25% slow |
| 0 | X | 20 | Count at 1 MHz |
| 1–255 | 1 | 20 | Normal part of .26% fast |
| 1–255 | 0 | 19 | 5% fast part of .26% fast |
| 256–511 | X | 19 | 5% fast |
| 512–1023 | X | 19 | 5% fast |
| 1024–2047 | X | 19 | 5% fast |
| 2048–4095 | X | 18 | 11% fast |
| 4096–8191 | X | 18 | 11% fast |
| 8192–16838 | X | 18 | 11% fast |
| 16384–32767 | X | 18 | 11% fast |

The achievable increments in rate of change of the clock speed of the local time counter 58 are too coarse if only integer changes in N are considered. Accordingly, the N generator 64 also may adopt a mode wherein the value of N is switched on a regular basis so that over the long run fractional values of N may be simulated. For this purpose, a divide by sixteen counter 57 is connected to the output of the divide by N counter 56 to provide a signal DA to the N generator permitting a periodic change in the value of N. Specifically, for errors 62 having a magnitude of approximately 256, the value of N will be 20 (no correction) for 15 cycles of the output of divide by N counter 56 and will be 19 or 21 (correction for high or low error respectively) for one cycle of the output of divide by N counter 56 to provide an average correction of effectively equal to values of N of 19.93 or 20.06.

The N generator may be simply a look-up table such as is known in the art, taking as inputs the error 62 and the value DA and producing a value of N in response. The values of N are such as to slowly correct the local time to the value of the CST LSB indicated by the CST counter 50 eliminating the loss of time values or the occurrence of abrupt shifts in local time.

As described above, the local time is then used to synchronize the execution of instructions that may be received by the module 14. As described before, such instructions carry with them a trigger time that may be saved in a trigger time register 66.

The output of this trigger time register is provided to a comparator 68 which compares the trigger time from the trigger time register to the local time to produce a coincidence and an elapsed time signal 72 and 74. Coincidence signal 72 indicates that the local time equals the trigger time and thus that the instruction associated with that trigger time should be triggered. The coincidence signal 72 may be used to generate an interrupt causing the instruction to be executed by the microprocessor 28.

Elapsed time signal 74 indicates the difference between the trigger time and the local time to indicate how much time has passed since the triggering of the instruction or how much time remains before the instruction is triggered.

If the module 14 is a local master, the local time counter 58 is used as the reference for additional synchronization signals to be transmitted to dependent modules on a more frequent basis as has been described.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A functional module for an industrial controller providing a local time value based on a periodic synchronization value received from a remote source comprising:

(a) a synchronization counter receiving the periodic synchronization value;

(b) a time base providing a first clock signal having an adjustable frequency;

(c) a local time counter receiving the first clock signal to provide a local time value;

(d) a comparator for comparing the periodic synchronization value from the synchronization counter with the local time value from the local time counter to produce an error signal;

(e) a time base adjuster receiving the error signal and changing the frequency of the first clock signal to reduce the magnitude of the error signal;

wherein the time base also produces a second clock signal and wherein the synchronization counter receives the second clock signal to advance the value of the received periodic synchronization value after receiving the periodic synchronization value.

2. The apparatus of claim 1 including further:

(f) a trigger time register adapted to receive a trigger time value associated with an instruction; and (g) a comparator receiving the local time value from the local time clock and the trigger time value from the trigger time register and comparing the same to produce a trigger signal when the local time and the trigger time are the same.

3. The apparatus of claim 1 including further:

(f) a trigger time register adapted to receive a trigger time value associated with an instruction; and (g) a comparator receiving the local time value from the local time clock and the trigger time value from the trigger time register and comparing the same to produce a signal indicating the difference between the local time and the trigger time.

4. The apparatus of claim 1 wherein the time base adjuster is an electronic memory holding a table receiving values in a range of error signals matching them to values in the range of divisors.

5. The apparatus of claim 1 wherein the time base adjuster changes the frequency of the first clock signal by an amount corresponding to the magnitude of the error signal.

6. The apparatus of claim 1 wherein the time base is a single oscillator and wherein the first clock is produced by dividing a signal from the oscillator by a divisor received from the time base adjuster.

* * * * *